(12) United States Patent
Esmaeilzadeh et al.

(10) Patent No.: US 12,131,238 B2
(45) Date of Patent: *Oct. 29, 2024

(54) METHODS AND SYSTEMS FOR INTEGRATING MACHINE LEARNING/ANALYTICS ACCELERATORS AND RELATIONAL DATABASE SYSTEMS

(71) Applicant: Georgia Tech Research Corporation, Atlanta, GA (US)

(72) Inventors: Hadi Esmaeilzadeh, Atlanta, GA (US); Divya Mahajan, Atlanta, GA (US); Joon Kyung Kim, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 93 days.

This patent is subject to a terminal disclaimer.

(21) Appl. No.: 18/045,940

(22) Filed: Oct. 12, 2022

(65) Prior Publication Data

US 2023/0058055 A1 Feb. 23, 2023

Related U.S. Application Data

(63) Continuation of application No. 16/355,512, filed on Mar. 15, 2019, now Pat. No. 11,521,112.

(60) Provisional application No. 62/643,329, filed on Mar. 15, 2018.

(51) Int. Cl.
*G06N 20/00* (2019.01)
*G06F 9/50* (2006.01)
*G06F 16/242* (2019.01)
*G06F 16/901* (2019.01)
*G06N 5/02* (2023.01)

(52) U.S. Cl.
CPC .......... *G06N 20/00* (2019.01); *G06F 9/5011* (2013.01); *G06F 9/5038* (2013.01); *G06F 16/2448* (2019.01); *G06F 16/9024* (2019.01); *G06N 5/02* (2013.01)

(58) Field of Classification Search
None
See application file for complete search history.

(56) References Cited

U.S. PATENT DOCUMENTS

| | | |
|---|---|---|
| 9,141,670 B2 | 9/2015 | Branscome et al. |
| 2011/0202550 A1 | 8/2011 | Chen |
| 2016/0012107 A1 | 1/2016 | Asaad et al. |
| 2016/0098439 A1 | 4/2016 | Dickie et al. |
| 2016/0125118 A1 | 5/2016 | Chaudhuri et al. |

*Primary Examiner* — Eric C Wai
(74) *Attorney, Agent, or Firm* — Troutman Pepper Hamilton Sanders LLP; Ryan A. Schneider (57) ABSTRACT

A method for database management that includes receiving an algorithm from a user. Based on the algorithm, a hierarchical dataflow graph (hDFG) may be generated. The method may further include generating an architecture for a chip based on the hDFG. The architecture for a chip may retrieve a data table from a database. The data table may be associated with the architecture for a chip. Finally, the algorithm may be executed against the data table, such that an action included in the algorithm is performed.

16 Claims, 5 Drawing Sheets

METHODS AND SYSTEMS FOR INTEGRATING MACHINE LEARNING/ANALYTICS ACCELERATORS AND RELATIONAL DATABASE SYSTEMS

CROSS-REFERENCE TO RELATED APPLICATION

This application is a continuation of U.S. patent application Ser. No. 16/355,512 filed 15 Mar. 2019, which claims priority under 35 USC § 119(e) to U.S. Provisional Patent Application No. 62/643,329 filed 15 Mar. 2018, the contents of each is hereby incorporated in its entirety as if fully set forth herein.

STATEMENT REGARDING FEDERALLY SPONSORED RESEARCH OR DEVELOPMENT

This invention was made with government support under grant numbers CNS #1703812, ECCS #1609823, CCF #1553192 awarded by the by the National Science Foundation, and award #FA9550-17-1-027 awarded by the Air Force Office of Scientific Research. The government has certain rights in the invention.

THE NAMES OF THE PARTIES TO A JOINT RESEARCH AGREEMENT

Not Applicable

SEQUENCE LISTING

Not Applicable

STATEMENT REGARDING PRIOR DISCLOSURES BY THE INVENTOR OR A JOINT INVENTOR

Not Applicable

BACKGROUND OF THE DISCLOSURE

1. Field of the Disclosure

The presently disclosed subject matter relates generally to methods and systems for database management and, more particularly, to methods and systems for generating a chip architecture to perform an algorithm against certain data.

2. Background

The data revolution is being fueled by advances in several areas, including databases, high-performance computer architecture, and machine learning. Databases, more than ever before, are capable of storing tremendous amounts of data. Machine learning algorithms, among other things, are able to quickly identify correlations that would take humans days, if not weeks. Further, the computer architecture, where these databases are housed and on which the machine learning algorithms are performed, has grown increasingly powerful and efficient.

Despite these advances, implementing machine learning algorithms against larger databases has proven timely and manually intensive. Accordingly, there is a need for an improved method and system for generating an architecture capable of efficiently executing a machine learning algorithm against large databases.

BRIEF SUMMARY OF THE DISCLOSURE

Aspects of the disclosed technology include methods and systems for database management.

In an exemplary embodiment, the present invention is a method comprising determining, based at least in part on a dataflow graph, a chronological order of one or more operations needed to perform an action against a database, generating an architecture for a chip based on at least one of the dataflow graph and the chronological order of one or more operations, wherein the architecture for a chip includes instructions based on the chronological order of one or more operations, retrieving, by the architecture for a chip and from the database, a data table, associating the data table with the architecture for a chip, and executing an algorithm, designed to perform the action against the database, against the architecture for a chip such that the action is performed against the data table.

The dataflow graph can be a hierarchical dataflow graph (hDFG).

The algorithm can be a machine learning algorithm.

The method can further comprise receiving user defined functions associated with the algorithm.

The hDFG can include nodes and edges. Each node can comprise a respective mathematical operation. Each edge can comprise a respective multi-dimensional vector.

The method can further comprise determining, based on, at least in part, the user defined functions, the one or more operations needed to perform the action against the database.

In another exemplary embodiment, the present invention is a method comprising generating, based on an algorithm including operations needed to perform an action against a database, a hierarchical dataflow graph (hDFG), generating, based on the hDFG, an architecture for a chip, retrieving, by the architecture for a chip and from the database, a data table, associating the data table with the architecture for a chip, and executing the algorithm against the architecture for a chip such that the action is performed against the data table.

The method can further comprise determining, based at least in part on the hDFG, a chronological order for the operations.

The algorithm can be a machine learning algorithm.

The hDFG can include nodes representing the operations.

The architecture for a chip can include an access engine, wherein retrieving the data table is performed by the access engine.

The architecture for a chip can include an execution engine, wherein executing the algorithm is performed by the execution engine.

The method can further comprise receiving, from a user, the algorithm, and determining, based at least in part on the hDFG, a chronological order for the operations, wherein the algorithm is a machine learning algorithm, wherein the hDFG includes nodes and edges, wherein each node represents the respective operation and a respective mathematical operation, and wherein each edge comprises a respective multi-dimensional vector, wherein the architecture for a chip includes a first set of instructions, a second set of instructions, an access engine, and an execution engine, wherein retrieving the data table is performed by the access engine, and wherein executing the algorithm is performed by the execution engine.

The method can further comprise determining, based at least in part on the hDFG, a chronological order for the operations, generating, based on the chronologically ordered operations, a first set of instructions and a second set of instructions, compiling the first set of instructions and the second set of instructions into executable code, generating, based on the first set of instructions, an access engine, associating the access engine with the architecture for a chip, generating, based on the second set of instructions, an execution engine, and associating the execution engine with the architecture for a chip, wherein retrieving the data table is performed by the access engine, and wherein executing the algorithm is performed by the execution engine.

Each node can comprise a respective mathematical operation.

The hDFG can further include edges, wherein each edge can comprise a respective multi-dimensional vector.

In another exemplary embodiment, the present invention is a system comprising one or more processors, and memory in communication with the one or more processors and storing computer program code that, when executed by the one or more processors, is configured to cause the system to perform a method herein disclosed.

In another exemplary embodiment, the present invention is a method for database management comprising receiving, by a transceiver and from a user, user defined functions, the user defined functions associated with an algorithm, wherein the algorithm is designed to perform an action against a database, determining, based on, at least in part, the user defined functions, operations needed to perform the action against the database, generating a hierarchical dataflow graph (hDFG), wherein the hDFG includes nodes and edges, determining, based on the hDFG, a chronological order for the respective operations, generating, based on the chronologically ordered operations, a first set of instructions and a second set of instructions, compiling the first set of instructions and the second set of instructions into executable code, generating an architecture for a chip based on at least one of the hDFG or the chronologically ordered operations, the architecture for a chip including the first set of instructions and the second set of instructions, retrieving, by the architecture for a chip and from the database, a data table, associating the data table with the architecture for a chip, and executing the algorithm against the architecture for a chip such that the action is performed against the data table.

The algorithm can be a machine learning algorithm.

Each of the nodes can further comprise a respective mathematical operation.

Each of the edges can comprise a respective multi-dimensional vector.

The method can further comprise generating, based on the first set of instructions, an access engine, and associating the access engine with the architecture for a chip.

Retrieving the data table from the database cam be performed by the access engine.

The method can further comprise generating, based on the second set of instructions an execution engine, and associating the execution engine with the architecture for a chip.

Executing the algorithm against the architecture for a chip can be performed by the execution engine.

In another exemplary embodiment, the present invention is a method for database management comprising receiving, from a user, an algorithm, the algorithm including operations needed to perform an action against a database, generating, based on the algorithm, a hDFG, the hDFG including nodes representing the respective operations, generating, based on the hDFG, an architecture for a chip, the architecture for a chip including a first set of instructions, a second set of instructions, an access engine, and an execution engine, retrieving, by the architecture for a chip and from the database, the data table, associating the data table with the architecture for a chip, and executing the algorithm against the architecture for a chip such that the action is performed against the data table.

The method can further comprise determining, based on the hDFG, a chronological order for the respective operations.

The algorithm can be a machine learning algorithm.

Each of the nodes can further comprise a respective mathematical operation.

The hDFG can further comprise edges, an each of the edges can comprise a respective multi-dimensional vector.

Retrieving the data table from the database can be performed by the access engine.

Executing the algorithm against the architecture for a chip can be performed by the execution engine.

In another exemplary embodiment, the present invention is a database management comprising one or more processors and memory in communication with the one or more processors and storing computer program code that, when executed by the one or more processors, is configured to cause the system to receive an algorithm, the algorithm including operations needed to perform an action against a database, generate, based on the algorithm, a hDFG, the hDFG including nodes representing the respective operations, generate, based on the hDFG, an architecture for a chip, the architecture for a chip including a first set of instructions, a second set of instructions, an access engine, and an execution engine, receive, from the architecture for a chip, the data table, associate the data table with the architecture for a chip, and execute the algorithm against the architecture for a chip such that the action is performed against the data table.

The memory can further cause the one or more processors to determine, based on the hDFG, a chronological order for the respective operations.

Each of the nodes can further comprise a respective mathematical operation.

The hDFG can further comprise edges, and each of the edges can comprise a respective multi-dimensional vector.

The algorithm can be a machine learning algorithm.

In other exemplary embodiments, methods can include one or more processors, computing devices, or databases. In some cases, the methods and systems may include receiving user defined functions from a user. The user defined functions may be associated with an algorithm designed to perform an action against a database (e.g., an update function). The method may further include determining, based on, at least in part, the user defined functions, operations needed to perform the action against the database. Next, the method may generate a hDFG. Subsequently, the method may determine a chronological order of the operations based on the hDFG. Afterwards, the method may generate a first set of instructions and a second set of instructions based on the chronologically ordered operations. The first set of instructions and the second set of instructions may be compiled into executable code. The method may further include generating an architecture for a chip based on the hDFG and/or the chronologically ordered operations. The architecture for a chip may retrieve a data table from the database and further associate the data table with the architecture for a chip. Finally, the method may include executing the algorithm against the architecture for a chip such that the action is performed against the data table.

In some embodiments, generating the hDFG may be based on the algorithm.

In some embodiments, the algorithm may be a machine learning algorithm.

In some embodiments, each of the nodes may further comprise a respective mathematical operation.

In some embodiments, each of the edges comprise a respective multi-dimensional vector.

According to some embodiments, the method may further include generating an access engine based on the first set of instructions and associating the access engine with the architecture for a chip.

In some embodiments, the access engine may retrieve the data table from the database.

According to some embodiments, the method may further include generating an execution engine based on the second set of instructions and associating the execution engine with the architecture for a chip.

In some embodiments, the execution engine may execute the algorithm against the architecture for a static chip.

These and other aspects of the present disclosure are described in the Detailed Description below and the accompanying figures. Other aspects and features of embodiments of the present disclosure will become apparent to those of ordinary skill in the art upon reviewing the following description of specific, example embodiments of the present disclosure in concert with the figures. While features of the present disclosure may be discussed relative to certain embodiments and figures, all embodiments of the present disclosure can include one or more of the features discussed herein.

Further, while one or more embodiments may be discussed as having certain advantageous features, one or more of such features may also be used with the various embodiments discussed herein. In similar fashion, while exemplary embodiments may be discussed below as device, system, or method embodiments, it is to be understood that such exemplary embodiments can be implemented in various devices, systems, and methods of the present disclosure.

BRIEF DESCRIPTION OF THE DRAWINGS

The following detailed description of specific embodiments of the disclosure will be better understood when read in conjunction with the appended drawings. For the purpose of illustrating the disclosure, specific embodiments are shown in the drawings. It should be understood, however, that the disclosure is not limited to the precise arrangements and instrumentalities of the embodiments shown in the drawings.

DETAILED DESCRIPTION

Although preferred embodiments of the disclosure are explained in detail, it is to be understood that other embodiments are contemplated. Accordingly, it is not intended that the disclosure is limited in its scope to the details of construction and arrangement of components set forth in the following description or illustrated in the drawings. The disclosure is capable of other embodiments and of being practiced or carried out in various ways. Also, in describing the preferred embodiments, specific terminology will be resorted to for the sake of clarity.

It must also be noted that, as used in the specification and the appended claims, the singular forms "a," "an" and "the" include plural referents unless the context clearly dictates otherwise.

Also, in describing the preferred embodiments, terminology will be resorted to for the sake of clarity. It is intended that each term contemplates its broadest meaning as understood by those skilled in the art and includes all technical equivalents which operate in a similar manner to accomplish a similar purpose.

Ranges can be expressed herein as from "about" or "approximately" one particular value and/or to "about" or "approximately" another particular value. When such a range is expressed, another embodiment includes from the one particular value and/or to the other particular value.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Examples of the present disclosure may involve automatically mapping a high-level specification of advanced analytics queries to an architecture for a chip. The architecture for a chip may be generated for one or more user defined functions (UDF), expressed as a part of a query (e.g., an SQL query) using a domain-specific language (e.g., Python). To realize an efficient in-database integration, embodiments of the present disclosure may contain an atypical hardware structure (e.g., an access engine), directly interfacing with the buffer pool of the database. The access engine may extract, cleanse, and process the training data tuples that are consumed by a multi-threaded the execution engine that executes the analytics algorithm. Embodiments of the present disclosure may be integrated with PostgreSQL to generate hardware accelerators for a range of real-world and synthetic datasets running diverse machine learning algorithms.

In an example scenario, a real estate agent, Mary, wants to run a program identifying residents of Georgia likely to purchase homes in the next six months. To identify the residents, Mary has a programmer, Dave, write a program evaluating several criteria (e.g., income, renter status, years renting, credit score, and/or age). Mary uploads the program to a computer. The computer runs a second program that determines the steps necessary to execute Mary's program against a database containing all the residents of Georgia. Running Mary's program against the entire database or downloading the contents of the database and then running Mary's program against the copy of the database would be time consuming because the computer's processor must perform other tasks in addition to querying the database. Here, the operations associated with Mary's program are ultimately used to generate a dedicated architecture for a chip that accesses pages of a database, retrieves portions of the database, and executes the algorithm against the database. Therefore, while the computer's processor performs several tasks, the architecture for a chip is able to independently query the database and output the results to Mary quickly.

Reference will now be made in detail to exemplary embodiments of the disclosed technology, examples of which are illustrated in the accompanying drawings and disclosed herein. Wherever convenient, the same references numbers will be used throughout the drawings to refer to the same or like parts.

Figure 1:
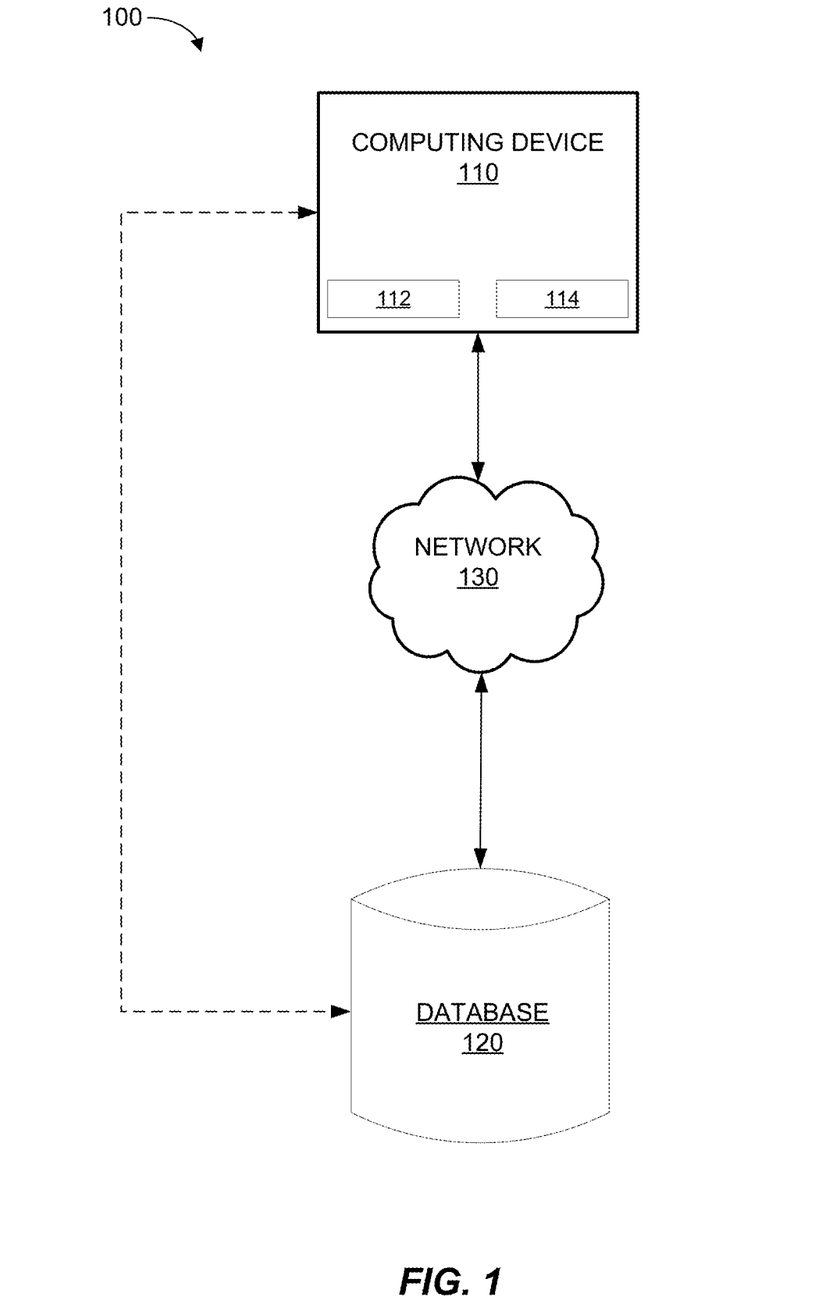
FIG. 1 is a diagram of an example system for database management, in accordance with some examples of the present disclosure.

FIG. 1 shows an example environment 100 where certain aspects of the present disclosure may be implemented. The components and arrangements shown in FIG. 1 are not intended to limit the disclosed embodiments as the components used to implement the disclosed processes and features can vary. As shown in FIG. 1, in some implementations the environment 100 may include a computing device 110 and a database 120. The computing device 110 may include a processor 112 and an application 114. The database 120 may be part of another device having one or more processors. As non-limiting examples, the computing device 110 may be a personal computer, a laptop computer, a tablet, a desktop computer, a mainframe, and/or the like. The network 130 can include a network of interconnected computing devices such as, for example, an intranet, a cellular network, or the Internet. And, while shown as a single device in FIG. 1, the web server 130 can include one or more physical or logical devices (e.g., servers), cloud servers, remote servers, etc. An example computer architecture that may be used to implement the computing device 110 may be described below with reference to FIG. 5.

The computing device 110 may receive one or more user defined functions (UDFs) from a user. The user may input the UDFs via the application 114. The processor 112 may determine the operations needed to perform the action against the database. Further, the processor 112 may generate a hierarchical dataflow graph (hDFG). The hDFG may include nodes and edges. The processor 112 may also generate a first set of instructions and/or a second set of instructions based on the chronologically ordered operations. The first set of instructions and/or the second set of instructions may be compiled by the computing device 110. In some embodiments, the processor 112 may perform this function. The processor 112 may also generate an architecture for a chip 200 based on the hDFG and/or the chronologically ordered operations.

The architecture for a chip 200 may be located within an area of memory of the computing device 110. The architecture for a chip 200 may retrieve a data table from the database 120. The computing device 110 may be in communication with the database 120 via the network. In other embodiments, the computing device 110 may physically connect to the database 120. The architecture for a chip 200 may associate the data table with itself, i.e., store the information associated with the data table on the architecture for a chip 200. Furthermore, the architecture for a chip 200 may execute the algorithm such that an action associated with the algorithm is performed on the data table.

Figure 2:
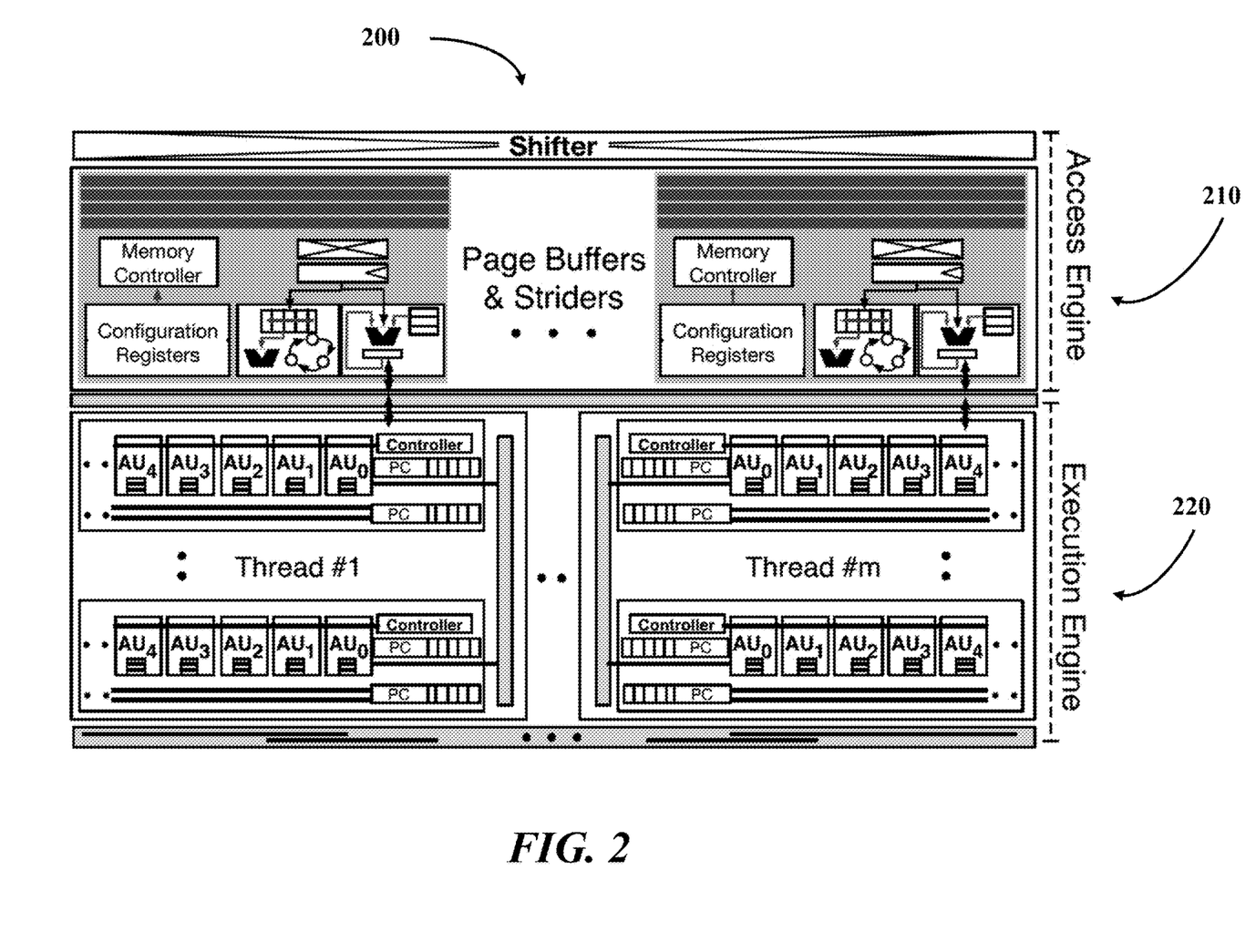
FIG. 2 is an illustration of an architecture for a chip, in accordance with some examples of the present disclosure.

FIG. 2 shows an illustration of an architecture for a chip. The architecture for a chip may include an access engine 210 and an execution engine 220. The access engine 210 and/or the execution engine 220 may be multi-threaded. Further, the access engine 210 and/or the execution engine 220 may have a respective custom Instruction Set Architecture (ISA) to program their hardware designs. The access engine 210 may include a first program (e.g., Striders), ensuring compatibility between data stored in the database 120 and the execution engine 220 by performing the computations required by the algorithm. The access engine 210 and the execution engine 220 may be configured according to the page layout and the user defined function (UDF) specification, respectively.

The access engine 210 may be responsible for storing pages of data and converting them from a database page format to raw numbers that may be processed by the execution engine 220. The access engine 210 may use the Advanced Extensible Interface (AXI) interface to transfer the data to and from the execution engine 220, the shifters properly align the data, and the first program unpacks the database pages. AXI interface may be a type of Advanced Microcontroller Bus Architecture open-standard, on-chip interconnect specification for system-on-a-chip (SoC) designs. It may be vendor agnostic and standardized across different hardware platforms. The access engine 210 may use this interface to transfer uncompressed database pages to page buffers and configuration data to configuration registers. Configuration data may include the first program and execution engine instructions and necessary meta-data. Both the training data in the database pages and the configuration data may be passed through a shifter for alignment, according to the read width of the block RAM on a target Field Programmable Array (FPGA). A separate channel for configuration data may incorporate a finite state machine to dictate the route and destination of the configuration information.

To amortize the cost of data transfer and avoid the suboptimal usage of the FPGA bandwidth, the access engine 210 and the first program may process database data at a page level granularity. Training data may be written to multiple page buffers, where each buffer stores one database page at a time and has access to its personal Strider (discussed below). Alternatively, each tuple could have been extracted from the page by the central processing unit (CPU) and sent to the FPGA for consumption by the execution engine 220. This approach would likely fail to exploit the bandwidth available on the FPGA, as only one tuple would be sent at a time. Furthermore, using the CPU for data extraction would have a significant overhead due to the handshaking between CPU and FPGA. Offloading tuple extraction to the accelerator using the first program may provide a unique opportunity to dynamically interleave unpacking of data in the access engine 210 and processing it in the execution engine 220.

It may be common for data to be spread across pages, where each page employs pointer chasing. Two tuples may not be simultaneously processed from a single page buffer, as the location of one could depend on the previous. Therefore, examples of the present disclosure may store multiple pages on the FPGA and may parallelize data extraction from the pages across their corresponding first program. For every page, the first program may first process the page header and extract necessary information about the page and store it in the configuration registers. The information may include offsets, such as the beginning and size of each tuple, which may be either located or computed from the data in the header. This auxiliary page information is used to trace the tuple addresses and read the corresponding data from the page buffer. After each page buffer, the shifter may ensure alignment of the tuple data for the first program. From the tuple data, its header is processed to extract and route the training data to the execution engine. The number of first programs and database pages stored on-chip can be adjusted according to the Broadcast Recognition Access Method (BRAM) storage available on the target FPGA. The internal workings of the first program are dictated by its instructions that depend on the page layout and page size of the target Relational Data Base Management System (RDBMS).

Figure 3:
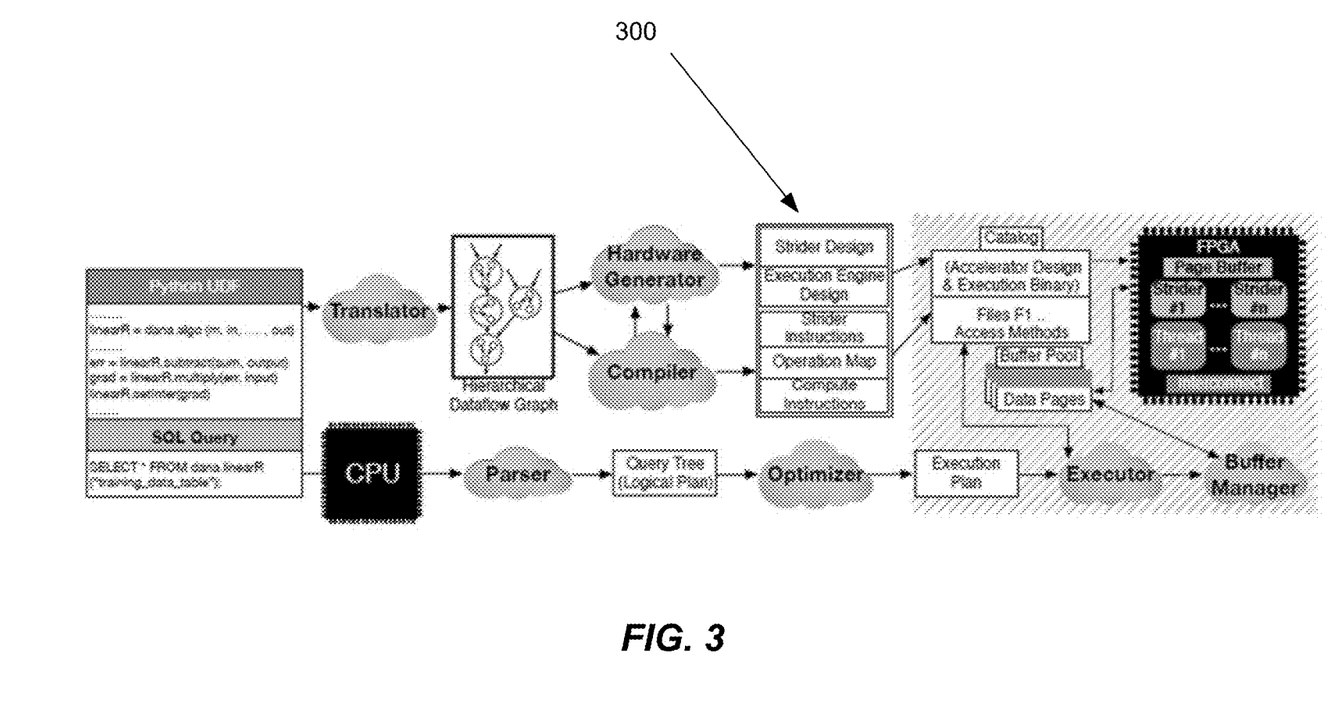
FIG. 3 is an example workflow diagram for database management, in accordance with some examples of the present disclosure.

FIG. 3 illustrates an example workflow diagram for database management. The bottom section of the diagram illustrates integration within the traditional software stack of data management systems and the top portion represents certain embodiments of the present disclosure. As shown, a user may specify her desired algorithm as a UDF using a simple domain-specific language (DSL) integrated within Python. The system 300 may perform static analysis and compilation of the Python functions to program the FPGA with a high-performance, energy-efficient hardware accelerator design. The hardware design may be tailored to both the algorithm and page specifications of the RDBMS engine. To run the hardware accelerated UDF on her training data, the user may provide a SQL query. The system 300 may store accelerator metadata (Strider and execution engine instruction schedules) in the RDBMS's catalog along with the name of a UDF to be invoked from the query. As shown in FIG. 3, the RDBMS catalog may be shared by the database engine and the FPGA. The RDBMS may parse, optimize, and execute the query while treating the UDF as a black box. During query execution, the RDBMS may fill the buffer pool, from which the system 300 may ship the data pages to the FPGA for processing. The system 300 and the RDBMS engine may work in tandem to generate the appropriate data stream, data route, and accelerator design for the algorithm, database page layout, FPGAg triad. Each component of the system 300 is briefly described below.

The following describes the programming interface as shown in FIG. 3. The front end may expose a Python-embedded DSL to express the ML algorithm as a UDF. The UDF may include an update rule that specifies how each tuple or record in the training data updates the ML model. The UDF may also include a merge function that specifies how to process multiple tuples in parallel and aggregate the resulting ML models. The DSL may constitute a diverse set of operations and data types that cater to a wide range of advanced analytics algorithms. Any combination of these operations may be automatically converted to a final synthesizable FPGA accelerator (e.g., architecture for a chip 200).

Turning to the translator, the translator may convert the UDF into a hierarchical DataFlow Graph (hDFG) by the parser. Each node in the hDFG may represent a mathematical operation allowed by the DSL, and each edge may be a multidimensional vector on which the operations may be performed. The information in the hDFG may enable the backend to optimally customize the reconfigurable architecture and schedule and map each operation for a high-performance execution.

The hardware may interface with the database engine through a specialized structure called Striders, that may extract high-performance, and provide low energy computation. Striders may eliminate the CPU from the data transformation process by directly interfacing with a buffer pool of the database 120 to extract the training data pages. Further, the first program (e.g., Striders) may process data at a page granularity to amortize the cost of per-tuple data transfer from memory to the FPGA. To exploit this vast amount of data available on-chip, the architecture may be equipped with execution engines (e.g., execution engine 220) running multiple parallel instances of the update rule. This architecture may be customized by a compiler and a hardware generator in accordance to the FPGA specifications, database page layout, and/or the analytics function.

Both the access engine 210 and the execution engine 220 may be programmed using their respective Instruction Set Architectures (ISAs). The Strider instructions may process page headers, tuple headers, and extract the raw training data from a database page. Different page sizes and page layouts may be targeted using this ISA. The ISA associated with the execution engine 220 may describe the operation flow required to run the analytics algorithm in selective Single-Instruction Multi-Data (SIMD) mode.

The compiler and hardware generator may ensure compatibility between the hDFG and the hardware accelerator. For the given hDFG and FPGA specifications (such as number of DSP Slices and BRAMs), the hardware generator may determine the parameters for the execution engine and Striders to generate the final FPGA synthesizable accelerator. The compiler may convert the database page configuration into a set of instructions that process the page and tuple headers and transform user data into a floating point format. Additionally, the compiler may generate a static schedule for the accelerator, a map of where each operation is performed, and/or execution engine instructions.

As described above, providing flexibility and reconfigurability of hardware accelerators for advanced analytics is a challenging but pertinent problem. Examples of the present disclosure present a multifaceted solution that untangles these challenges one by one.

Figure 4:
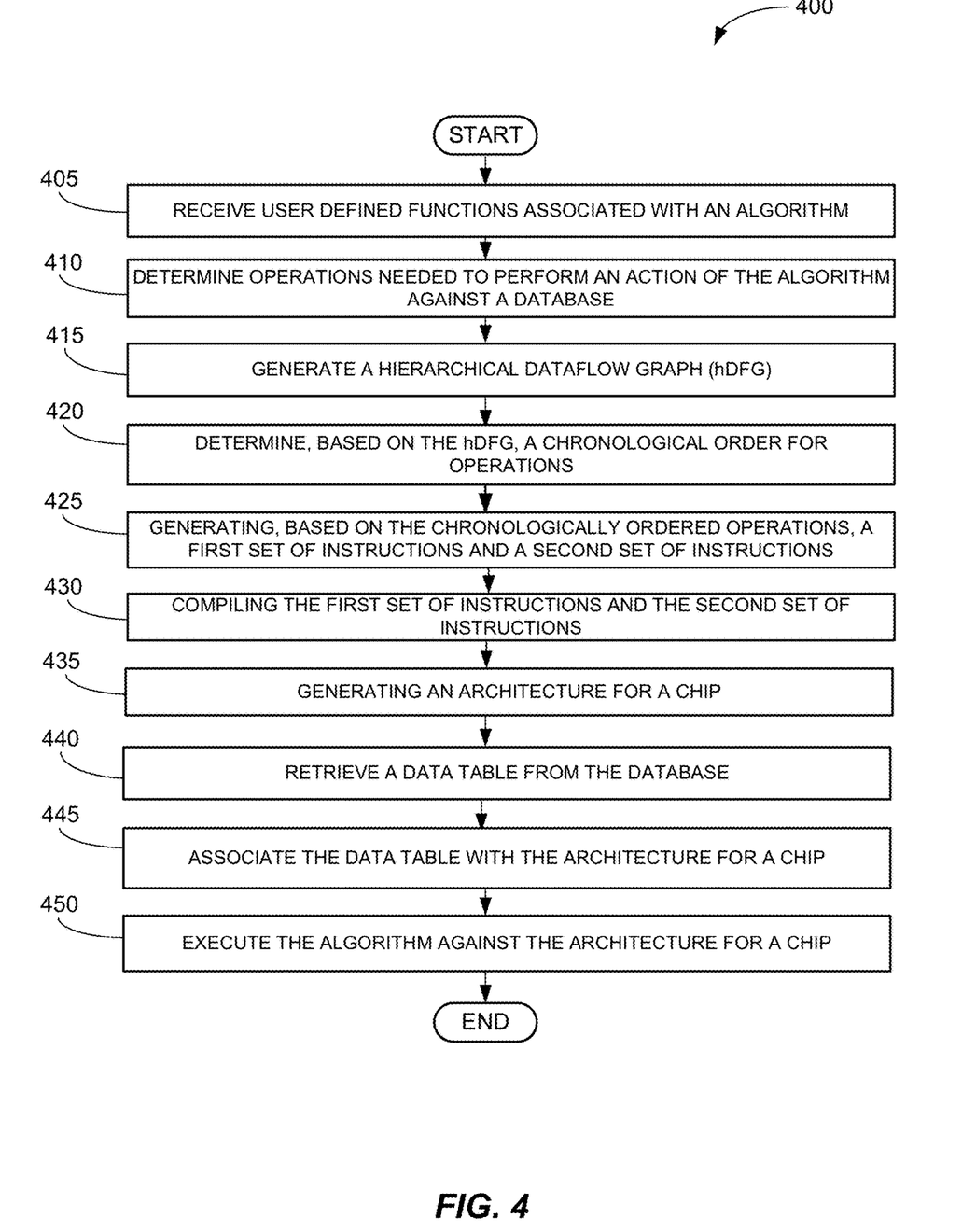
FIG. 4 is an example flow chart of a method for database management, in accordance with some examples of the present disclosure.

FIG. 4 illustrates an example flow chart of a method for database management. At 405, the method may include receiving one or more user defined functions associated with an algorithm. The user defined functions may be received by a transceiver of the computing device 110. The algorithm may include instructions to perform an action against the database 120 (e.g., update, delete, and/or re-order). At 410, based at least in part on the user defined functions, the method may determine one or more operations needed to perform the action against the database 120. In some embodiments, the processor 112 may determine the one or more operations. At 415, the method may generate a hDFG. In some embodiments, generating the hDFG may be based on the one or more user defined functions. The hDFG may include nodes and edges. The nodes may represent a mathematical operation (e.g., multiply, add, gaussian, and/or sigmoid). Meanwhile, the edges may represent a multi-dimensional vector.

At 420, based on the hDFG, the method may include determining a chronological order for the respective operations. At 425, based on the chronologically ordered operations, the method may generate a first set of instructions and a second set of instructions (e.g., ISA). At 430, the first and second set of instructions may be compiled into executable code. At 435, the method may include generating the architecture for a chip 200. Generating the architecture for a chip 200 may be based on the hDFG and/or the chronologically ordered operations. Further, the architecture for a chip 200 may include the first set of instructions and/or the second set of instructions. At 440, the architecture for a chip 200 may retrieve a data table from the database 120. Next, at 445, the architecture for a chip 200 may associate the data table with the architecture for a chip 200. At 450, the architecture for a chip 200 may execute the algorithm such that the associated action is performed against the table.

Figure 5:
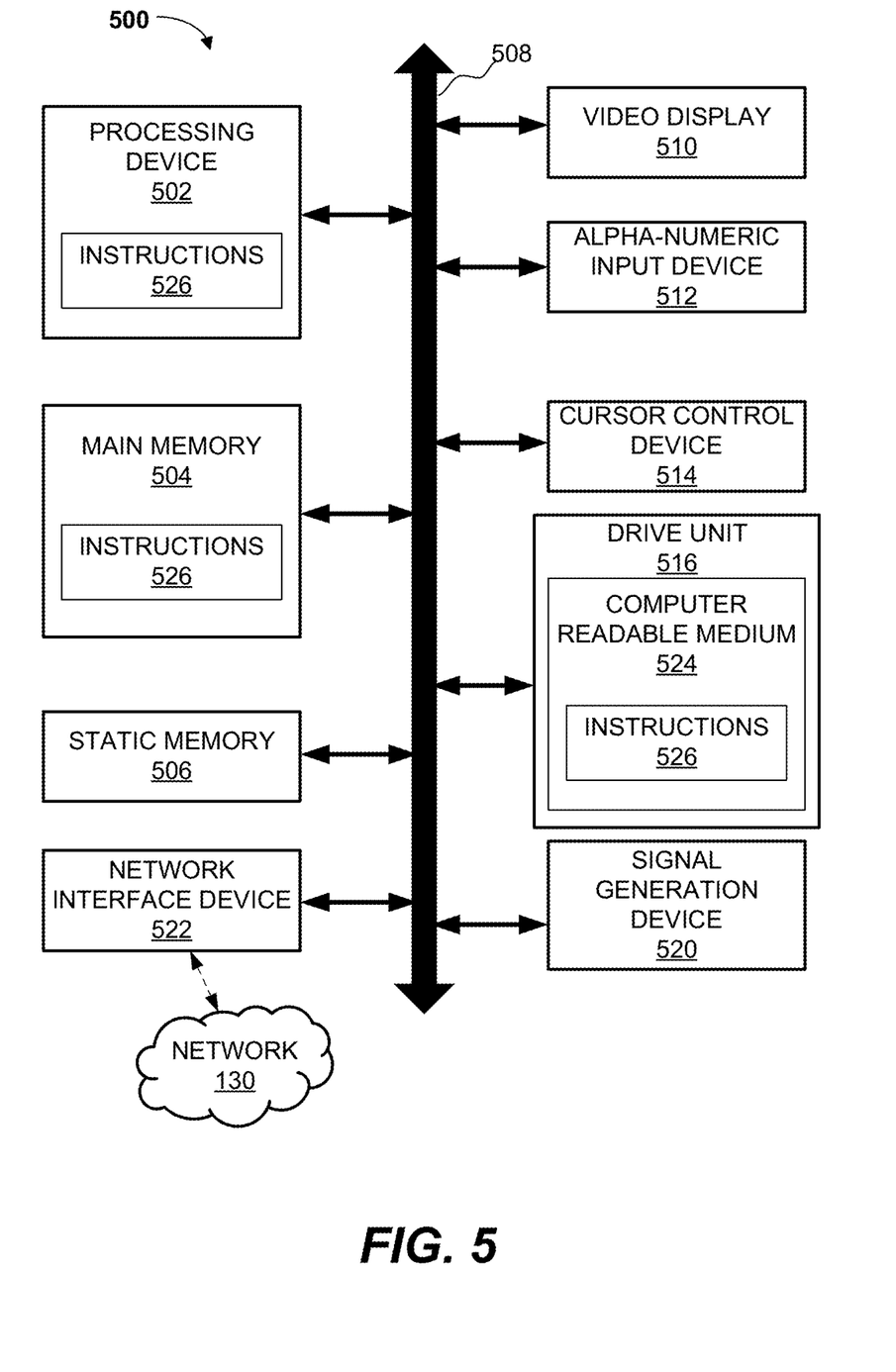
FIG. 5 is a block diagram of an example computer system for providing database management, in accordance with some examples of the present disclosure.

FIG. 5 is a block diagram of an example computer system 500 that can implement certain aspects of the present disclosure. For example, the computer system 500 can be representative of the computing device 110. The computer system 500 can include a set of instructions 526 for controlling operation of the computer system 500. In some implementations, the computer system 500 can be connected (e.g., networked) to other machines in a Local Area Network (LAN), an intranet, an extranet, a satellite communications system, or the Internet. The computer system 500 can operate in the capacity of a server or a client machine in a client-server network environment, or as a peer machine in a peer-to-peer (or distributed) network environment. As non-limiting examples, the computer system 500 can be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single computer system 500 is illustrated, the term "machine" shall also be taken to include any collection of machines (e.g., computers) that individually or jointly execute a set (or multiple sets) of instructions to perform any one or more of the methodologies discussed herein.

The computer system 500 includes a processing device 502, a main memory 504 (e.g., read-only memory (ROM), flash memory, dynamic random-access memory (DRAM) such as synchronous DRAM (SDRAM), etc.), a static memory 506 (e.g., flash memory, static random-access memory (SRAM), etc.), and a secondary memory 516 (e.g., a data storage device), which communicate with each other via a bus 508.

The processing device 502 represents one or more general-purpose processing devices such as a microprocessor, a microcontroller, a central processing unit, or the like. As non-limiting examples, the processing device 502 can be a reduced instruction set computing (RISC) microcontroller, a complex instruction set computing (CISC) microprocessor, a RISC microprocessor, very long instruction word (VLIW) microprocessor, a processor implementing other instruction sets, or one or more processors implementing a combination of instruction sets. The processing device 502 can also be one or more special-purpose processing devices such as an application specific integrated circuit (ASIC), a field programmable gate array (FPGA), a digital signal processor (DSP), network processor, or the like. The processing device 502 is configured to execute the operations for electronically creating and trading derivative products based on one or more indices relating to volatility.

The computer system 500 can further include a network interface device 522, which is connectable to a network 130. The computer system 500 also can include a video display unit 510, i.e., a display (e.g., a liquid crystal display (LCD), a touch screen, or a cathode ray tube (CRT)), an alphanumeric input device 512 (e.g., a keyboard), a cursor control device 514 (e.g., a mouse), and a signal generation device 520 (e.g., a speaker).

The secondary memory 516 can include a non-transitory storage medium 524 on which is stored one or more sets of instructions 526 for the computer system 500 representing any one or more of the methodologies or functions described herein. For example, the instructions 526 can include instructions for implementing an asset tracking device including a power source and power management system or subsystem for a container or a trailer. The instructions 526 for the computer system 500 can also reside, completely or at least partially, within the main memory 504 and/or within the processing device 502 during execution thereof by the computer system 500, the main memory 504 and the processing device 502 also constituting computer-readable storage media.

While the storage medium 524 is shown in an example to be a single medium, the term "storage medium" should be taken to include a single medium or multiple media that store the one or more sets of instructions for a processing device. The term "storage medium" shall also be taken to include any medium that is capable of storing or encoding a set of instructions for execution by the machine that cause the machine to perform any one or more of the methodologies of the disclosure. The term "storage medium" shall accordingly be taken to include, but not be limited to, solid-state memories, and optical and magnetic media.

It is to be understood that the embodiments and claims disclosed herein are not limited in their application to the details of construction and arrangement of the components set forth in the description and illustrated in the drawings. Rather, the description and the drawings provide examples of the embodiments envisioned. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based can be readily used as a basis for the design of other structures, methods, and systems for carrying out the several purposes of the embodiments and claims presented in this application. It is important, therefore, that the claims be regarded as including such equivalent constructions.

What is claimed is:

1. A method comprising:
    determining, based at least in part on a dataflow graph, a chronological order of one or more operations needed to perform an action against a database;
    generating an architecture for a chip based on the dataflow graph, wherein the architecture for a chip includes instructions;
    compiling the instructions into executable code;
    generating, based on the instructions, an access engine and an execution engine;
    associating the access engine and the execution engine with the architecture for a chip;
    retrieving, by the access engine, a data table;
    associating the data table with the architecture for a chip; and
    executing, by the execution engine, an algorithm, designed to perform the action against the database, against the architecture for a chip such that the action is performed against the data table.

2. The method of claim 1, wherein the dataflow graph is a hierarchical dataflow graph (hDFG).

3. The method of claim 2, wherein the hDFG includes nodes and edges;
    wherein each node comprises a respective mathematical operation; and
    wherein each edge comprises a respective multi-dimensional vector.

4. The method of claim 1, wherein the algorithm is a machine learning algorithm.

5. The method of claim 1 further comprising receiving user defined functions associated with the algorithm.

6. The method of claim 5 further comprising determining, based on, at least in part, the user defined functions, the one or more operations needed to perform the action against the database.

7. A method comprising:
receiving, from a user, a machine learning algorithm including operations needed to perform an action against a database;
generating, based on the machine learning algorithm, a hierarchical dataflow graph (hDFG), wherein the hDFG includes nodes, each node representing a respective operation of the operations needed to perform the action and a respective mathematical operation;
determining, based at least in part on the hDFG, a chronological order for the respective operations;
generating, based on the hDFG, an architecture for a chip including an access engine and an execution engine;
retrieving, by the access engine, a data table;
associating the data table with the architecture for a chip; and
executing the algorithm against the architecture for a chip by the execution engine such that the action is performed against the data table.

8. The method of claim 7, wherein the hDFG further includes edges, each edge comprising a respective multi-dimensional vector.

9. A method of comprising:
receiving, from a user, a machine learning algorithm including operations needed to perform an action against a database;
generating, based on the machine learning algorithm, a hierarchical dataflow graph (hDFG);
determining, based at least in part on the hDFG, a chronological order for the operations;
generating, based on the hDFG, an architecture for a chip;
retrieving, by the architecture for a chip and from the database, a data table;
associating the data table with the architecture for a chip; and
executing the machine learning algorithm against the architecture for a chip such that the action is performed against the data table;
wherein:
the hDFG includes nodes and edges, each node representing the respective operation and a respective mathematical operation, and each edge comprising a respective multi-dimensional vector;
the architecture for a chip includes a first set of instructions, a second set of instructions, an access engine, and an execution engine;
retrieving the data table is performed by the access engine; and
executing the machine learning algorithm is performed by the execution engine.

10. A method comprising:
generating, based on an algorithm including operations needed to perform an action against a database, a hierarchical dataflow graph (hDFG);
determining, based at least in part on the hDFG, a chronological order for the operations;
generating, based on the chronologically ordered operations, a first set of instructions and a second set of instructions;
generating, based on the hDFG, an architecture for a chip;
compiling the first set of instructions and the second set of instructions into executable code;
generating, based on the first set of instructions, an access engine;
associating the access engine with the architecture for a chip;
generating, based on the second set of instructions, an execution engine; and
associating the execution engine with the architecture for a chip;
retrieving a data table by the access engine;
associating the data table with the architecture for a chip; and
executing, by the execution engine, the algorithm against the architecture for a chip such that the action is performed against the data table.

11. The method of claim 10, wherein the hDFG includes nodes each comprising a respective mathematical operation.

12. The method of claim 11, wherein the hDFG further includes edges;
wherein each edge comprises a respective multi-dimensional vector.

13. A system comprising:
one or more processors; and
memory in communication with the one or more processors and storing computer program code that, when executed by the one or more processors, is configured to cause the system to perform the method of claim 1.

14. A system comprising:
one or more processors; and
memory in communication with the one or more processors and storing computer program code that, when executed by the one or more processors, is configured to cause the system to perform the method of claim 7.

15. A system comprising:
one or more processors; and
memory in communication with the one or more processors and storing computer program code that, when executed by the one or more processors, is configured to cause the system to perform the method of claim 9.

16. A system comprising:
one or more processors; and
memory in communication with the one or more processors and storing computer program code that, when executed by the one or more processors, is configured to cause the system to perform the method of claim 10.

* * * * *